Nov. 9, 1948.  R. C. WILSON  2,453,393
COMBINED SPOON AND LID FOR CONTAINERS
Filed Sept. 17, 1945
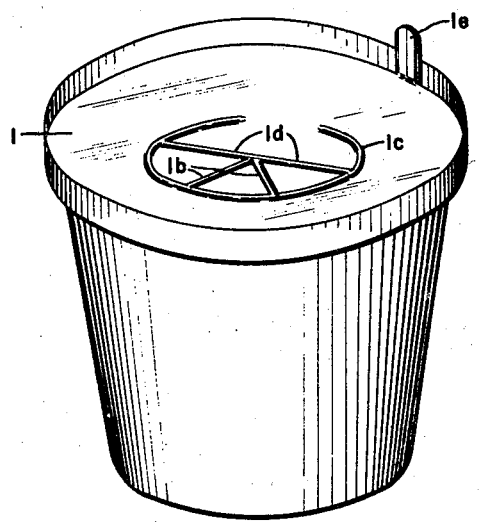
FIG. 1
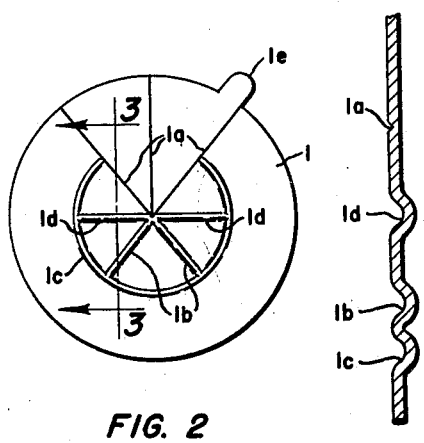
FIG. 2
FIG. 3
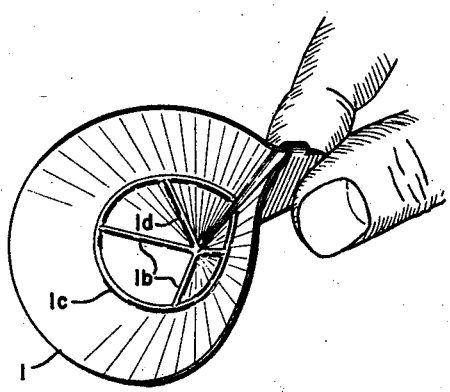
FIG. 4
INVENTOR.
ROBERT C. WILSON
BY A. B. Bowman
ATTORNEY Patented Nov. 9, 1948

2,453,393

UNITED STATES PATENT OFFICE 2,453,393

COMBINED SPOON AND LID FOR CONTAINERS

Robert C. Wilson, Chula Vista, Calif., assignor of one-fourth to Richard W. Wilson, Chula Vista, Calif.

Application September 17, 1945, Serial No. 616,849

2 Claims. (Cl. 229—1.5)

My invention relates to a combined spoon and lid for containers primarily an improvement over my former Patent Number 2,375,266, more particularly for use in connection with ice cream cups or the like wherein said lid is positioned until the contents of the cup must be removed, whereupon said lid is readily usable as a spoon for removing said contents from said cup.

The objects of my invention are:

First, to provide a combined spoon and lid for containers of this class which is readily removable and may be formed into a cup-shaped spoon;

Second, to provide a combined spoon and lid for containers of this class having an arcuate formed portion intermediate the middle portion and the periphery thereof which facilitates the uniform bending of the material when formed into a spoon;

Third, to provide a combined spoon and lid for containers of this class in which an arcuate recess in the material of the lid interconnected by similar recesses radiating from the center thereof facilitates uniform bending of the lid into a spoon;

Fourth, to provide a combined spoon and lid for containers of this class in which a segment of a lid is folded by means of three scored lines, two of which are aligned with the radiating recessed portions terminating in arcuate recessed portions inducing uniform pyramidal bending of the center of said lid whereby a substantially symmetrical spoon may be formed therefrom;

Fifth, to provide a combined spoon and lid for containers of this class having three radially scored portions and a radially extending tab portion adjacent one of said scored portions whereby said tab portion may be folded over the segments intermediate said scored portion when they are folded together providing means for maintaining the lid in the form of a spoon;

Sixth, to provide a combined spoon and lid for containers of this class which when folded into a spoon provides a spoon of the proper size to be inserted in the cup from which it was removed in order to remove the contents of said cup; and Seventh, to provide a combined spoon and lid for containers of this class which is very simple and economical in construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is a perspective view of my combined spoon and lid for containers shown in connection with a cup; Fig. 2 is a bottom plan view thereof; Fig. 3 is an enlarged fragmentary sectional view taken from the line 3—3 of Fig. 2; and Fig. 4 is a perspective view of my combined spoon and lid for containers shown formed into a spoon and held by a person's fingers ready for use.

Similar characters of reference refer to similar parts and portions throughout the several views of the drawing.

My combined spoon and lid for containers is constructed of a disc-shaped member 1 which may be made of hard paper or any other suitable material as desired. The normally under side of this disc-shaped member 1 is provided with three radially disposed scored portions 1a as shown in cross section in Fig. 3 of the drawing. Aligned with the outermost scored portions 1a and extending from the opposite side of the center of the disc 1 are the recessed portions 1b. These recessed portions 1b terminate in the arcuate recessed portions 1c which extend around the middle portion of the disc 1 and terminate at its intersection with the radially disposed scored portions 1a, all as shown best in Fig. 2 of the drawing. The middle portion of the disc 1 is also provided with radially extending recessed portions 1d similar to the recessed portions 1b, which also terminate in the arcuate recessed portions 1c. These radially disposed recessed portions 1d and 1b extending from the middle of the disc 1 and terminating in the arcuate recessed portion 1c provide bending portions which promote the uniform deflection of the middle portion of the disc 1 when the segments intermediate the scored portions 1a are folded against each other as shown in Fig. 4 of the drawings.

It will be here noted that the tab portion 1e adjacent one of the scored portions 1a may be folded over the segments intermediate the scored portions 1a while holding the disc-shaped member 1 in the form of a spoon as shown in Fig. 4 of the drawings.

The operation of this combined spoon and lid for containers is substantially as follows: When placed in connection with the cup as shown in Fig. 1 of the drawings the tab portion 1e extends upwardly and the scored portions 1a are on the normally lower side. The recessed portions 1b, 1c and $1d$ are visable on the upper surface of the disc-shaped member $1$. When it is desirous to uncover the contents in the cup, the tab $1e$ is grasped and the combined spoon and lid is removed from the upper portion of the cup. The segment portions between the scored lines $1a$ may be folded against each other and the tab $1e$ is then folded over said segment portion maintaining the disc-shaped member $1$ in the form of a spoon as illustrated in Fig. 4 of the drawings. When the segment portions intermediate the scored portions $1a$ are folded against each other, bending is induced in the remainder of the disc-shaped member $1$ and is augmented by a yielding of the recessed portions $1b$, $1c$ and $1d$. The radially disposed recessed portions $1d$ and $1b$ promote uniform radial bending intermediate the segments which they divide inside the arcuate recessed portion $1c$. Thus a substantially uniform pyramidal bending of the disc-shaped member $1$ is had forming a very useful spoon of the lid removed from the cup.

Though I have shown and described a particular construction combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a combined spoon and lid for containers of the class described, the combination of a flat disc-like member having an arcuate recessed portion concentrically disposed and radially disposed recessed portions extending from the middle of said disc-like member and terminating in said arcuate recessed portion, said disc-like member also provided with radially disposed scored portions extending through the periphery thereof permitting two segments of said disc-shaped member to be folded against each other to induce pyramidal bending of the remainder of said disc-shaped member.

2. In a combined spoon and lid for containers of the class described, the combination of a flat disc-like member having an arcuate recessed portion concentrically disposed and radially disposed recessed portions extending from the middle of said disc-like member and terminating in said arcuate recessed portion, said disc-like member also provided with radially disposed scored portions extending through the periphery thereof permitting two segments of said disc-shaped member to be folded against each other to induce pyramidal bending of the remainder of said disc-shaped member, said disc-shaped member also provided with a tab portion extending from the periphery thereof and adapted to be folded over said segment portions when folded together securing said disc-shaped member in the form of a spoon.

ROBERT C. WILSON.

REFERENCES CITED

The following references are of record in the file of this patent:

UNITED STATES PATENTS

| Number | Name | Date |
|---|---|---|
| 1,121,259 | Klin | Dec. 15, 1914 |
| 1,172,483 | Rike et al. | Feb. 22, 1916 |
| 1,880,534 | Jannings | Apr. 14, 1931 |

FOREIGN PATENTS

| Number | Country | Date |
|---|---|---|
| 213,399 | Great Britain | Apr. 3, 1924 |